US011787891B2

(12) United States Patent
Nozawa et al.

(10) Patent No.: US 11,787,891 B2
(45) Date of Patent: Oct. 17, 2023

(54) MODIFIED BLOCK COPOLYMER COMPOSITION

(71) Applicant: ZEON CORPORATION, Tokyo (JP)

(72) Inventors: Atsushi Nozawa, Tokyo (JP); Sadaharu Hashimoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 591 days.

(21) Appl. No.: 16/649,663

(22) PCT Filed: Sep. 27, 2018

(86) PCT No.: PCT/JP2018/035940
§ 371 (c)(1),
(2) Date: Mar. 23, 2020

(87) PCT Pub. No.: WO2019/065842
PCT Pub. Date: Apr. 4, 2019

(65) Prior Publication Data
US 2020/0255650 A1 Aug. 13, 2020

(30) Foreign Application Priority Data
Sep. 29, 2017 (JP) ................................ 2017-190625

(51) Int. Cl.
C08F 290/02 (2006.01)
C08F 236/10 (2006.01)
C09J 7/35 (2018.01)
C08F 230/08 (2006.01)
C08K 5/00 (2006.01)
C08L 53/02 (2006.01)
C08F 290/04 (2006.01)

(52) U.S. Cl.
CPC ........ *C08F 236/10* (2013.01); *C08F 230/085* (2020.02); *C08F 290/044* (2013.01); *C08K 5/0016* (2013.01); *C08K 5/0025* (2013.01); *C08L 53/025* (2013.01); *C09J 7/35* (2018.01); *C08F 2810/30* (2013.01); *C08F 2810/40* (2013.01); *C08G 2261/1642* (2013.01); *C08L 2205/025* (2013.01); *C09J 2453/00* (2013.01)

(58) Field of Classification Search
CPC ..... C08L 53/025; C08L 2205/025; C09J 7/35; C09J 2453/00; C08F 230/085; C08F 236/10; C08F 2810/30; C08F 2810/40; C08F 290/044; C08K 5/0016; C08K 5/0025; C08G 2261/1642
USPC .......................................................... 525/98
See application file for complete search history.

(56) References Cited

U.S. PATENT DOCUMENTS 5,700,874 A 12/1997 Takeichi et al.
6,117,927 A * 9/2000 Toba ..................... B60C 1/0025
525/105
2018/0258328 A1 9/2018 Nozawa et al.

FOREIGN PATENT DOCUMENTS

JP H08113609 A 5/1996
WO 2017057049 A1 4/2017

OTHER PUBLICATIONS

Peacock et al., "5.2.3.3 Melt Flow Rate," Polymer Chemistry: Properties and Applications, Hanser Publishers, 85-86. (Year: 2006).*
May 6, 2021, the Extended European Search Report issued by the European Patent Office in the corresponding European Patent Application No. 18860613.1.
Dec. 4, 2018, International Search Report issued in the International Patent Application No. PCT/JP2018/035940.
Mar. 31, 2020, International Preliminary Report on Patentability issued in the International Patent Application No. PCT/JP2018/035940.

* cited by examiner

Primary Examiner — Ling Siu Choi
Assistant Examiner — David L Miller
(74) Attorney, Agent, or Firm — KENJA IP LAW PC

(57) ABSTRACT

The present invention provides a modified block copolymer composition comprising a modified block copolymer containing at least one aromatic vinyl polymer block and at least one conjugated diene polymer block, and having at least one modified terminal modified with a compound having a silicon atom and an acrylic group and/or a methacrylic group.

5 Claims, No Drawings

MODIFIED BLOCK COPOLYMER COMPOSITION

TECHNICAL FIELD

The present invention relates to a modified block copolymer composition which can provide a hot-melt adhesive composition having excellent hot-melt properties, thermal stability, and high-temperature adhesiveness.

BACKGROUND ART

Hot-melt adhesives solidify in a short time, thereby efficiently bonding a variety of articles. In addition, hot-melt adhesives have high safety to human bodies because these adhesives do not need any solvent. For these reasons, the hot-melt adhesives are used in a variety of fields.

In such hot-melt adhesives, it is known that a variety of thermoplastic resins can be used as a base polymer. For example, a styrene-isoprene block copolymer is known as one example of such a base polymer.

For example, Patent Document 1 discloses a block copolymer composition containing a block copolymer which has a diblock moiety as a branch and is represented by $(Ar^1-D^1)_mX$ (where $Ar^1$ is an aromatic monovinyl polymer block, $D^1$ is a conjugated diene polymer block, m is an integer of 3 or more, and X is a residue of a polyfunctional coupling agent), and a block copolymer which is represented by $Ar^2-D^2$ (where $Ar^2$ is an aromatic monovinyl polymer block, and $D^2$ is a conjugated diene polymer block) in a specific proportion, and a hot-melt adhesive composition comprising such a block copolymer composition.

Although Patent Document 1 provides a hot-melt adhesive composition having high hot-melt properties and high thermal stability, the hot-melt adhesive composition does not always have sufficient high-temperature adhesiveness, which leads to a demand for a hot-melt adhesive composition having high hot-melt properties and thermal stability while having further enhanced high-temperature adhesiveness.

RELATED ART DOCUMENTS

Patent Documents

Patent Document 1: WO2017/057049

SUMMARY OF THE INVENTION

Problem to be Solved by the Invention

The present invention has been made in consideration of such circumstances, and an object of the present invention is to provide a modified block copolymer composition which can provide a hot-melt adhesive composition having excellent hot-melt properties, thermal stability, and high-temperature adhesiveness.

Means for Solving Problems

The present inventors, who have conducted extensive research to achieve the above object, have found that the problem above can be solved by introducing a terminal modification such that a polymer chain terminal of a block copolymer containing at least one aromatic vinyl polymer block and at least one conjugated diene polymer block is modified with a compound having a silicon atom and an acrylic group and/or a methacrylic group, and have completed the present invention.

In other words, the present invention provides a modified block copolymer composition comprising a modified block copolymer containing at least one aromatic vinyl polymer block and at least one conjugated diene polymer block and having at least one modified terminal modified with a compound having a silicon atom and an acrylic group and/or a methacrylic group.

In the modified block copolymer composition according to the present invention, the modified terminal preferably has a structure in which a hydrocarbyloxysilane compound (β) having an acrylic group and/or a methacrylic group is bonded via a hydrocarbyloxysilane compound (α) without an acrylic group and/or a methacrylic group.

In the modified block copolymer composition according to the present invention, the proportion of the modified terminal is preferably 10 mol % or more of the polymer chain terminals of the total block copolymers contained in the modified block copolymer composition.

In the modified block copolymer composition according to the present invention, it is preferred that the content of aromatic vinyl monomer units in the modified block copolymer composition be within the range of 0.1 to 50 mass %, the weight average molecular weight (Mw) of the entire modified block copolymer composition is in the range of 10,000 to 1,000,000, and the melt index of the modified block copolymer composition measured according to ASTM D1238 (condition G, 200° C., load: 5 kg) be within the range of 0.1 to 100 g/10 min.

Moreover, the present invention provides a hot-melt adhesive composition comprising 100 parts by mass of the modified block copolymer composition according to any of the above embodiments, 25 to 400 parts by mass of a tackifying resin, 0.01 to 50 parts by mass of a cross-linking agent, and 0 to 200 parts by mass of a plasticizer.

Furthermore, the present invention provides a cured adhesive composition prepared by cross-linking the hot-melt adhesive composition.

In the cured adhesive composition according to the present invention, 20 mass % or more of the block copolymers contained in the hot-melt adhesive composition is preferably cross-linked.

Effects of Invention

The present invention can provide a modified block copolymer composition which can provide a hot-melt adhesive composition having excellent hot-melt properties, thermal stability, and high-temperature adhesiveness, and a hot-melt adhesive composition and a cured adhesive composition prepared using such a modified block copolymer composition.

DESCRIPTION OF EMBODIMENTS (Modified Block Copolymer Composition)

The modified block copolymer composition according to the present invention comprises a modified block copolymer (hereinafter, referred to as "modified block copolymer A") containing at least one aromatic vinyl polymer block and at least one conjugated diene polymer block and having at least one modified terminal modified with a compound having a silicon atom and an acrylic group and/or a methacrylic group.

In the modified block copolymer A contained in the modified block copolymer composition according to the present invention, a modifying terminal moiety derived from the compound having a silicon atom and an acrylic group and/or a methacrylic group is introduced to a polymer chain terminal of the block copolymer containing at least one aromatic vinyl polymer block and at least one conjugated diene polymer block.

The block copolymer used in the present invention contains at least one aromatic vinyl polymer block which is a polymer block composed of repeating units which are mainly aromatic vinyl monomer units prepared through polymerization of an aromatic vinyl monomer, and at least one conjugated diene polymer block which is a polymer block composed of repeating units which are mainly conjugated diene monomer units prepared through polymerization of a conjugated diene monomer.

Any aromatic vinyl compound can be used as the aromatic vinyl monomer used to form the aromatic vinyl monomer units of the aromatic vinyl polymer block. Examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinyl naphthalene, and the like. Among these, use of styrene is preferred. These aromatic vinyl monomers can be used alone or in combination. If the block copolymer contains a plurality of aromatic vinyl polymer blocks, these aromatic vinyl polymer blocks may be composed of the same aromatic vinyl monomer unit, or may be composed of different aromatic vinyl monomer units.

The aromatic vinyl polymer block may contain monomer units other than the aromatic vinyl monomer units as long as the aromatic vinyl monomer units form the main repeating units. Examples of the monomers forming the monomer units other than the aromatic vinyl monomer units which can be contained in the aromatic vinyl polymer block include conjugated diene monomers such as 1,3-butadiene and isoprene (2-methyl-1,3-butadiene), unsaturated nitrile monomers, unsaturated carboxylic acid or acid anhydride monomers, unsaturated carboxylic acid ester monomers, non-conjugated diene monomers, and the like. The content of the monomer units other than the aromatic vinyl monomer units in the aromatic vinyl polymer block is preferably 20 mass % or less, more preferably 10 mass % or less, particularly preferably substantially 0 mass %.

Any conjugated diene compound can be used as the conjugated diene monomer used to form the conjugated diene monomer units of the conjugated diene polymer block, and examples thereof include 1,3-butadiene, isoprene, 2,3-dimethyl-1,3-butadiene, 2-chloro-1,3-butadiene, 1,3-pentadiene, 1,3-hexadiene, and the like. Among these, use of 1,3-butadiene and/or isoprene is preferred, and use of isoprene is particularly preferred. A conjugated diene polymer block composed of isoprene units results in a hot-melt adhesive composition having higher adhesiveness and flexibility. These conjugated diene monomers can be used alone or in combination. If the block copolymer contains a plurality of conjugated diene polymer blocks, these conjugated diene polymer blocks may be composed of the same conjugated diene monomer unit, or may be composed of different conjugated diene monomer units. Furthermore, the unsaturated bonds of the conjugated diene polymer blocks may be partially hydrogenated.

The conjugated diene polymer block may contain monomer units other than the conjugated diene monomer units as long as the conjugated diene monomer units form the main repeating units. Examples of the monomers forming the monomer units other than the conjugated diene monomer units which can be contained in the conjugated diene polymer block include aromatic vinyl monomers such as styrene and α-methylstyrene, α,β-unsaturated nitrile monomers, unsaturated carboxylic acid or acid anhydride monomers, unsaturated carboxylic acid ester monomers, non-conjugated diene monomers, and the like. The content of the monomer units other than the conjugated diene monomer units in the conjugated diene polymer block is preferably 20 mass % or less, more preferably 10 mass % or less, particularly preferably substantially 0 mass %.

Although the vinyl bond content in the conjugated diene polymer block (the proportion of 1,2-vinyl bond units and 3,4-vinyl bond units in the total conjugated diene monomer units contained in the conjugated diene polymer block) is not particularly limited, the content is preferably 1 to 20 mol %, more preferably 2 to 15 mol %, particularly preferably 3 to 10 mol %.

The block copolymer used in the present invention can have any number of polymer blocks bonded in any arrangement as long as the block copolymer contains at least one aromatic vinyl polymer block and at least one conjugated diene polymer block. Where Ar is an aromatic vinyl polymer block and D is a conjugated diene polymer block, specific examples of the arrangement of the block copolymer used in the present invention include aromatic vinyl-conjugated diene block copolymers represented by Ar-D; aromatic vinyl-conjugated diene-aromatic vinyl block copolymers represented by Ar-D-Ar; conjugated diene-aromatic vinyl-conjugated diene block copolymers represented by D-Ar-D; aromatic vinyl-conjugated diene-aromatic vinyl-conjugated diene block copolymers represented by Ar-D-Ar-D; and the like. Where X is a residue of a coupling agent, the block copolymer used in the present invention may also be an aromatic vinyl-conjugated diene-aromatic vinyl block copolymer represented by (Ar-D)n-X (where n is an integer of 2 or more) or a conjugated diene-aromatic vinyl-conjugated diene block copolymer represented by (D-Ar)n-X (where n is an integer of 2 or more). Furthermore, the block copolymer used in the present invention may also be a mixture of block copolymers which contains two or more of the copolymers described above in any combination. Among these, the aromatic vinyl-conjugated diene block copolymers represented by Ar-D, the aromatic vinyl-conjugated diene-aromatic vinyl block copolymers represented by Ar-D-Ar, and mixtures thereof can be suitably used, and the aromatic vinyl-conjugated diene-aromatic vinyl block copolymers represented by Ar-D-Ar are particularly suitably used.

The modified block copolymer A contained in the modified block copolymer composition according to the present invention may be any of the block copolymers above having a polymer chain terminal at which a modifying terminal moiety derived from the compound having a silicon atom and an acrylic group and/or a methacrylic group is introduced. To reduce byproducts during production of the modified block copolymer A, such a modified terminal preferably has a structure in which a hydrocarbyloxysilane compound (β) having an acrylic group and/or a methacrylic group is bonded via a hydrocarbyloxysilane compound (α) without an acrylic group and/or a methacrylic group. In other words, the modified terminal preferably has a structure in which a modifying structure derived from the hydrocarbyloxysilane compound (β) having an acrylic group and/or a methacrylic group is bonded to the polymer chain terminal of the block copolymer via a modifying structure derived from the hydrocarbyloxysilane compound (α) without an acrylic group and/or a methacrylic group. By bonding the hydrocarbyloxysilane compound (β) having an acrylic group and/or a methacrylic group via the hydrocarbyloxysilane compound (α) without an acrylic group and/or a methacrylic group, the modifying terminal moiety derived from the compound having a silicon atom and an acrylic group and/or a methacrylic group can be more appropriately introduced to the polymer chain terminal of the block copolymer.

Examples of the hydrocarbyloxysilane compound (α) without an acrylic group and/or a methacrylic group include tetraalkoxysilane compounds such as tetramethoxysilane and tetraethoxysilane; hexaalkoxysilane compounds such as bis(trimethoxysilyl)ethane and bis(trimethoxysilyl)hexane; alkylalkoxysilane compounds such as methyltriethoxysilane; vinylalkoxysilane compounds such as vinyltrimethoxysilane; arylalkoxysilane compounds such as phenyltrimethoxysilane; halogenoalkoxysilane compounds such as triethoxychlorosilane; epoxy group-containing alkoxysilane compounds such as 3-glycidoxyethyltrimethoxysilane, 3-glycidoxybutylpropyltrimethoxysilane, and bis(3-glycidoxypropyl)dimethoxysilane; sulfur-containing alkoxysilane compounds such as bis(3-(triethoxysilyl)propyl)disulfide; amino group-containing alkoxysilane compounds such as bis(3-trimethoxysilylpropyl)methylamine; isocyanate group-containing alkoxysilane compounds such as tris(3-trimethoxysilylpropyl)isocyanurate; and the like. Among these, tetraalkoxysilane compounds and hexaalkoxysilane compounds are preferred, and tetramethoxysilane is more preferred.

Examples of the hydrocarbyloxysilane compound (β) having an acrylic group and/or a methacrylic group include hydrocarbyloxysilane compounds having an acrylic group and/or a methacrylic group and three hydrocarbyloxy groups such as 3-acryloyloxypropyl(trimethoxysilane), 3-acryloyloxypropyl(triethoxysilane), 3-acryloyloxypropyl(tripropoxysilane), 3-acryloyloxypropyl(tributoxysilane), 3-methacryloyloxyethylpropyl(trimethoxysilane), 3-methacryloyloxyethylpropyl(triethoxysilane), 3-methacryloyloxyethylpropyl(tripropoxysilane), and 3-methacryloyloxyethylpropyl(tributoxysilane); hydrocarbyloxysilane compounds having an acrylic group and/or a methacrylic group and two hydrocarbyloxy groups such as 3-acryloyloxypropyl(diethoxymethoxysilane), 3-acryloyloxypropyl(dipropoxymethoxysilane), 3-acryloyloxypropyl(dibutoxymethoxysilane), 3-acryloyloxypropyl(dimethoxymethylsilane), 3-acryloyloxypropyl(diethoxymethylsilane), 3-acryloyloxypropyl(dipropoxymethylsilane), 3-acryloyloxypropyl(diisopropoxymethylsilane), 3-acryloyloxypropyl(dibutoxymethylsilane), 3-methacryloyloxyethylpropyl(diethoxymethoxysilane), 3-methacryloyloxyethylpropyl(dipropoxymethoxysilane), 3-methacryloyloxyethylpropyl(dibutoxymethoxysilane), 3-methacryloyloxyethylpropyl(dimethoxymethylsilane), 3-methacryloyloxyethylpropyl(diethoxymethylsilane), 3-methacryloyloxyethylpropyl(dipropoxymethylsilane), 3-methacryloyloxyethylpropyl(diisopropoxymethylsilane), and 3-methacryloyloxyethylpropyl(dibutoxymethylsilane); hydrocarbyloxysilane compounds having an acrylic group and/or a methacrylic group and one hydrocarbyloxy group such as 3-acryloyloxypropyl(methoxy dimethyl silane), 3-acryloyloxypropyl(ethoxy dimethyl silane), 3-acryloyloxypropyl(propoxydimethylsilane), 3-acryloyloxypropyl(isopropoxydimethylsilane), 3-acryloyloxypropyl(butoxydimethylsilane), 3-methacryloyloxyethylpropyl(methoxydimethylsilane), 3-methacryloyloxyethylpropyl(ethoxydimethylsilane), 3-methacryloyloxyethylpropyl(propoxydimethylsilane), 3-methacryloyloxyethylpropyl(isopropoxydimethylsilane), and 3-methacryloyloxyethylpropyl(butoxydimethylsilane); and the like. Among these, hydrocarbyloxysilane compounds having an acrylic group and/or a methacrylic group and three hydrocarbyloxy groups are preferred, and 3-acryloyloxypropyl(trimethoxysilane) and 3-methacryloyloxyethylpropyl(trimethoxysilane) are more preferred.

Although the modified block copolymer A contained in the modified block copolymer composition according to the present invention can have any weight average molecular weight (Mw), the weight average molecular weight (Mw) is in the range of preferably 30,000 to 400,000, more preferably 60,000 to 300,000. Use of the modified block copolymer A having a weight average molecular weight (Mw) within this range can provide a hot-melt adhesive composition having improved hot-melt properties, thermal stability, and high-temperature adhesiveness.

Although the modified block copolymer A can have any molecular weight distribution represented by the ratio (Mw/Mn) of the weight average molecular weight (Mw) to the number average molecular weight (Mn), the ratio is in the range of preferably 1.00 to 1.10, more preferably 1.00 to 1.03. Use of the modified block copolymer A having a molecular weight distribution (Mw/Mn) within this range can provide a hot-melt adhesive composition having improved hot-melt properties, thermal stability, and high-temperature adhesiveness. In the present invention, the weight average molecular weight (Mw) and the number average molecular weight (Mn) can be determined as values of the molecular weight measured by gel permeation chromatography (GPC) using tetrahydrofuran as a carrier and calibrated with polystyrene standards.

The proportion of the modified block copolymer A in the modified block copolymer composition according to the present invention is preferably 30 to 100 mass %, more preferably 50 to 100 mass % of the total block copolymer components which constitute the modified block copolymer composition. A proportion of the modified block copolymer A controlled within this range results in a hot-melt adhesive composition having improved high-temperature adhesiveness.

The modified block copolymer composition according to the present invention may contain block copolymers other than the modified block copolymer A. Examples of such block copolymers other than the modified block copolymer A include a coupled block copolymer B in which two or more of the block copolymers described above are coupled via a coupling structure derived from a compound having a silicon atom and an acrylic group and/or a methacrylic group. The coupled block copolymer B may be a polymer in which two or more of the block copolymers are coupled via a coupling structure in which a residue of a hydrocarbyloxysilane compound (β) having an acrylic group and/or a methacrylic group is bonded via a residue of a hydrocarbyloxysilane compound (α) without an acrylic group and/or a methacrylic group.

Although the coupled block copolymer B can have any weight average molecular weight (Mw), the weight average molecular weight (Mw) is in the range of preferably 60,000 to 1,200,000, more preferably 120,000 to 900,000. Although the coupled block copolymer B can have any molecular weight distribution (Mw/Mn), the molecular weight distribution (Mw/Mn) is in the range of preferably 1.00 to 1.10, more preferably 1.00 to 1.07.

The proportion of the coupled block copolymer B in the modified block copolymer composition according to the present invention is preferably 0 to 60 mass %, preferably 0 to 45 mass % of the total block copolymer components which constitute the modified block copolymer composition.

Furthermore, the modified block copolymer composition according to the present invention may further contain a block copolymer C other than the modified block copolymer A and the coupled block copolymer B. Examples of the block copolymer C other than the modified block copolymer A and the coupled block copolymer B include block copolymers (such as unmodified block copolymers) having polymer chains without any structure derived from the compound having a silicon atom and an acrylic group and/or a methacrylic group.

The modifying terminal moiety derived from the compound having a silicon atom and an acrylic group and/or a methacrylic group is present in a proportion of preferably 10 mol % or more, more preferably 40 mol % or more, still more preferably 50 mol % or more of the polymer chain terminals of the total block copolymers (the total block copolymers of the modified block copolymer A and the block copolymers other than the modified block copolymer A) contained in the modified block copolymer composition according to the present invention. The proportion of the modified terminal is an index indicating a degree of preferred modification, and it is sufficient that the proportion of the modified terminal determined by the calculation method described later exceeds the numeric values described here. If the proportion of the modifying terminal moiety derived from the compound having a silicon atom and an acrylic group and/or a methacrylic group is controlled within this range, the resulting hot-melt adhesive composition can have further improved high-temperature adhesiveness.

The proportion of the modified terminal can be calculated as the proportion (mol %) of the amount of the compound having a silicon atom and an acrylic group and/or a methacrylic group (which is equivalent to the amount of the modifying terminal moiety derived from the compound) per the amount of the organic lithium initiator to be used (which is equivalent to the amount of polymer chain terminals of the total block copolymers contained in the modified block copolymer composition according to the present invention) in (Method of producing modified block copolymer composition) described later. The amount of the modifying terminal moiety derived from the compound does not include the amount of the modified terminal consumed during generation of the coupled block copolymer B.

Although the content of the aromatic vinyl monomer units in the modified block copolymer composition according to the present invention, that is, the proportion of the aromatic vinyl monomer units in the total block copolymer components which constitute the modified block copolymer composition comprising the modified block copolymer A and optionally containing the coupled block copolymer B and the block copolymer C (hereinafter, referred to as "the content of the total aromatic vinyl monomer units" in some cases) is not particularly limited, the content is in the range of preferably 0.1 to 50 mass %, more preferably 5 to 40 mass %, still more preferably 7 to 35 mass %. A content of the total aromatic vinyl monomer units controlled within this range results in a hot-melt adhesive composition which can provide an adhesive having improved retention and adhesive force. The content of the total aromatic vinyl monomer units can be controlled, for example, by adjusting the compounding amounts of the block copolymers in consideration of the contents of the aromatic vinyl monomer units of the block copolymers which constitute the modified block copolymer composition. If the total block copolymer components which constitute the modified block copolymer composition are substantially composed of only the aromatic vinyl monomer units and the conjugated diene monomer units, the content of the total aromatic vinyl monomer units can be measured according to the method described in Rubber Chem. Technol., 45, 1295 (1972) because conjugated diene monomer unit portions are decomposed through ozone decomposition of the modified block copolymer composition followed by reduction with lithium aluminum hydride, so that aromatic monovinyl monomer moieties can be extracted.

Although the weight average molecular weight (Mw) of the entire modified block copolymer composition according to the present invention, that is, the weight average molecular weight (Mw) of the total block copolymer components which constitute the modified block copolymer composition comprising the modified block copolymer A and optionally containing the coupled block copolymer B and the block copolymer C is not particularly limited, the weight average molecular weight (Mw) is in the range of preferably 10,000 to 1,000,000, more preferably 30,000 to 400,000, still more preferably 60,000 to 300,000. A weight average molecular weight (Mw) of the entire modified block copolymer composition controlled within this range results in a hot-melt adhesive composition improved hot-melt properties and thermal stability.

Although the molecular weight distribution (Mw/Mn) of the entire modified block copolymer composition according to the present invention is not particularly limited, the molecular weight distribution (Mw/Mn) is in the range of preferably 1.00 to 1.30, more preferably 1.00 to 1.20.

Although the modified block copolymer composition according to the present invention can have any melt index without limitation, the melt index as a value measured according to ASTM D1238 (condition G, 200° C., load: 5 kg) is in the range of preferably 0.1 to 100 g/10 min, more preferably 3 to 75 g/10 min, still more preferably 6 to 50 g/10 min. A melt index controlled within this range results in a hot-melt adhesive composition having improved hot-melt properties and thermal stability.

(Method of Producing Modified Block Copolymer Composition)

The method of producing the modified block copolymer composition according to the present invention will now be described. Although the modified block copolymer composition according to the present invention can be produced by any method, suitable examples thereof include the following in the case where the modified block copolymer A contained in the modified block copolymer composition according to the present invention has the modified terminal having a structure in which the hydrocarbyloxysilane compound (β) having an acrylic group and/or a methacrylic group is bonded via the hydrocarbyloxysilane compound (α) without an acrylic group and/or a methacrylic group.

In other words, suitable examples thereof include a production method comprising:
  a polymerization step of sequentially polymerizing an aromatic vinyl monomer and a conjugated diene monomer in a polymerization solvent in the presence of an organic lithium initiator to prepare block copolymer chains each containing at least one aromatic vinyl polymer block and at least one conjugated diene polymer block;

a first modification step of reacting the hydrocarbyloxysilane compound (α) without an acrylic group and/or a methacrylic group with the block copolymer chains prepared through the polymerization step; and a second modification step of reacting the hydrocarbyloxysilane compound (β) having an acrylic group and/or a methacrylic group with the block copolymer chains reacted with the hydrocarbyloxysilane compound (α) without an acrylic group and/or a methacrylic group prepared through the first modification step.

(Polymerization Step)

The organic lithium initiator used in the polymerization step can be any known organic lithium initiator that can initiate the polymerization of the aromatic monovinyl monomer and the conjugated diene monomer. Specific examples thereof include organic monolithium initiators such as methyllithium, n-propyllithium, n-butyllithium, sec-butyllithium, and the like. Among these, n-butyllithium is preferred. The amount of the organic lithium initiator to be used may be determined by calculation according to the molecular weight of a desired polymer by a method known to persons skilled in the art. In the present invention, use of the organic lithium initiator causes the polymerization reaction to proceed while maintaining the livingness, so that polymers having active terminals are present in the polymerization reaction system. For this reason, the block copolymer chains prepared in the polymerization step in the present invention can have active terminals.

Any polymerization solvent inert to the organic lithium initiator can be used without limitation. For example, open-chain hydrocarbon solvents, cyclic hydrocarbon solvents or mixed solvents thereof can be used. Examples of the open-chain hydrocarbon solvents include $C_4$ to $C_6$ open-chain alkanes and alkenes such as n-butane, isobutane, n-hexane, and mixtures thereof; 1-butene, isobutylene, trans-2-butene, cis-2-butene, and mixtures thereof; 1-pentene, trans-2-pentene, cis-2-pentene, and mixtures thereof; n-pentane, isopentane, neo-pentane, and mixtures thereof; 1-pentene, trans-2-pentene, cis-2-pentene, and mixtures thereof; and the like. Examples of the cyclic hydrocarbon solvents include aromatic hydrocarbons such as benzene, toluene, and xylene; alicyclic hydrocarbons such as cyclohexane; and the like. To control the polymerization temperature and the molecular weight distribution, use of mixtures of the open-chain hydrocarbon solvents with the cyclic hydrocarbon solvents is preferred. These are used in a mass ratio "open-chain hydrocarbon solvent:cyclic hydrocarbon solvent" of more preferably 5:95 to 50:50, still more preferably 10:90 to 40:60.

The polymerization reaction can also be performed in the presence of a polar compound. Use of the polar compound allows adjustment of the polymerization initiation rate and the molecular weight distribution. Examples of the polar compound include aromatic or aliphatic ethers or tertiary amines having a relative permittivity (25° C.) of 2.5 to 5.0. Specific examples of the polar compounds include aromatic ethers such as diphenyl ether and anisole; aliphatic ethers such as diethyl ether and dibutyl ether; tertiary monoamines such as trimethylamine, triethylamine, and tripropylamine; tertiary polyamines such as tetramethylethylenediamine and tetraethylethylenediamine; and the like. These polar compounds may be used alone or in combination. The polar compound is used in an amount of preferably 0.001 to 50 mol, more preferably 0.005 to 10 mol relative to 1 mol of organic lithium initiator.

First Modification Step

In the first modification step, the above-mentioned hydrocarbyloxysilane compound (α) without an acrylic group and/or a methacrylic group is reacted with the block copolymer chains prepared through the polymerization step.

The organic lithium initiator is used to perform the polymerization reaction in the polymerization step in the present invention. The organic lithium initiator causes the polymerization reaction to proceed while maintaining the livingness, so that the resulting block copolymer chains can have active terminals. In the first modification step, the hydrocarbyloxysilane compound (α) without an acrylic group and/or a methacrylic group is reacted with the active terminals of such block copolymer chains having active terminals. Thereby, the modifying structure derived from the hydrocarbyloxysilane compound (α) without an acrylic group and/or a methacrylic group can be introduced into the polymer chain terminals of the block copolymer chains.

In the first modification step, where the active terminals of the block copolymer chains having active terminals prepared through the polymerization step above are reacted with the hydrocarbyloxysilane compound (α) without an acrylic group and/or a methacrylic group, it is believed that the active terminal of the block copolymer chain reacts with the silicon atom in the hydrocarbyloxysilane compound (α) without an acrylic group and/or a methacrylic group. It is also believed that as a result of the reaction with the silicon atom in the hydrocarbyloxysilane compound (α) without an acrylic group and/or a methacrylic group, a new bond is famed between the active terminal of the block copolymer chain and the silicon atom in the hydrocarbyloxysilane compound (α) without an acrylic group and/or a methacrylic group, and a modifying structure derived from the hydrocarbyloxysilane compound (α) without an acrylic group and/or a methacrylic group is introduced to the block copolymer chain; in addition, a reaction residue represented by —$O^-Li^+$ is famed between the oxygen atom in the hydrocarbyloxysilane compound (α) without an acrylic group and/or a methacrylic group and the metal atom which forms the active terminal of the block copolymer chain.

Although the hydrocarbyloxysilane compound (α) without an acrylic group and/or a methacrylic group can be used in any amount in the first modification step, the amount is preferably 0.5 to 1.2 mol, more preferably 0.75 to 1.1 mol relative to 1 mol of organic lithium initiator used in the polymerization step. By adjusting the amount of the hydrocarbyloxysilane compound (α) without an acrylic group and/or a methacrylic group to be used, the ratio of the modified block copolymer A and the coupled block copolymer B contained in the modified block copolymer composition finally produced can be controlled. For example, the proportion of the modified block copolymer A can be increased if a relatively large amount of hydrocarbyloxysilane compound (α) without an acrylic group and/or a methacrylic group is used, and the proportion of the coupled block copolymer B can be increased if a relatively small amount of hydrocarbyloxysilane compound (α) without an acrylic group and/or a methacrylic group is used.

The hydrocarbyloxysilane compound (α) without an acrylic group and/or a methacrylic group can be reacted with the block copolymer chains having the active terminals by any method. Examples thereof include a method of mixing these in a solvent which can dissolve them, and the like. The solvent to be used in this operation can be those exemplified as the solvents used in the polymerization step above. For this operation, the method of adding the hydrocarbyloxysilane compound (α) without an acrylic group and/or a methacrylic group to the polymerization solution used in the polymerization to prepare block copolymer chains is preferred because of its simplicity. Furthermore, in this operation, the hydrocarbyloxysilane compound (α) without an acrylic group and/or a methacrylic group is preferably dissolved in the solvent and added to the polymerization system. The solution concentration is preferably in the range of 1 to 50 mass %. The reaction temperature, although not particularly limited, is usually 0 to 120° C. The reaction time, although not particularly limited, is usually 1 minute to 1 hour.

Second Modification Step

In the second modification step, the block copolymer chains reacted with the hydrocarbyloxysilane compound (α) without an acrylic group and/or a methacrylic group prepared through the first modification step are reacted with the hydrocarbyloxysilane compound (β) having an acrylic group and/or a methacrylic group.

According to the present invention, the block copolymer chains have a reaction residue represented by —O⁻Li⁺ formed as a result of the reaction with the hydrocarbyloxysilane compound (α) without an acrylic group and/or a methacrylic group in the first modification step above. In the second modification step, the hydrocarbyloxysilane compound (β) having an acrylic group and/or a methacrylic group is reacted with such a reaction residue represented by —O⁻Li⁺ (including the group represented by —O⁻Li⁺ converted into a hydroxyl group through hydrolysis). Thereby, a modified structure in which the hydrocarbyloxysilane compound (β) having an acrylic group and/or a methacrylic group is bonded via the hydrocarbyloxysilane compound (α) without an acrylic group and/or a methacrylic group can be introduced to the block copolymer chains.

It is sufficient that the block copolymer chains reacted with the hydrocarbyloxysilane compound (α) without an acrylic group and/or a methacrylic group and used in the second modification step are those subjected to the first modification step above. In addition to those having the polymer chain terminals to which the modifying structure derived from the hydrocarbyloxysilane compound (α) without an acrylic group and/or a methacrylic group is introduced, the block copolymer chains may also include those having two or more block copolymer chains coupled via a coupling structure derived from the hydrocarbyloxysilane compound (α) without an acrylic group and/or a methacrylic group. Furthermore, the block copolymer chains may include the remaining block copolymer chains to which the modifying structure derived from the hydrocarbyloxysilane compound (α) without an acrylic group and/or a methacrylic group is not introduced.

Although the hydrocarbyloxysilane compound (β) having an acrylic group and/or a methacrylic group can be used in any amount in the second modification step, the amount is preferably 0.4 to 3.0 mol, more preferably 0.5 to 2.5 mol relative to 1 mol of organic lithium initiator used in the polymerization step. If the amount of the hydrocarbyloxysilane compound (β) having an acrylic group and/or a methacrylic group to be used is controlled within this range, the modifying terminal moiety derived from the compound having a silicon atom and an acrylic group and/or a methacrylic group can be more appropriately introduced to the polymer chain terminals of the block copolymer, and thus the resulting hot-melt adhesive composition can have more appropriately improved hot-melt properties, thermal stability, and high-temperature adhesiveness.

The hydrocarbyloxysilane compound (β) having an acrylic group and/or a methacrylic group can be added to a solution containing the block copolymer chains at any time after the hydrocarbyloxysilane compound (α) without an acrylic group and/or a methacrylic group is added in the first modification step above. For example, before or after the addition of the hydrocarbyloxysilane compound (β) having an acrylic group and/or a methacrylic group to the solution containing the block copolymer chains, by adding water or an alcohol such as methanol to this solution, the reaction residue represented by —O⁻Li⁺, which is famed through the reaction with the hydrocarbyloxysilane compound (α) without an acrylic group and/or a methacrylic group, is hydrolyzed and converted into a hydroxyl group, and the modification reaction may be performed in this state. During addition of the hydrocarbyloxysilane compound (β) having an acrylic group and/or a methacrylic group to the solution containing the block copolymer chains, the hydrocarbyloxysilane compound (β) having an acrylic group and/or a methacrylic group may be dissolved in an inert solvent and added, or may be directly added without being dissolved in an inert solvent. The same reaction temperature and the reaction time as those in the first step are used.

After the compound represented by the hydrocarbyloxysilane compound (β) having an acrylic group and/or a methacrylic group is reacted, a known polymerization terminator is optionally added to deactivate the reaction system. An antioxidant is added as needed, and then the polymerization solvent is separated from the reaction solution by a known polymer separation method (such as steam stripping), followed by a drying step. Thus, the modified block copolymer composition according to the present invention can be prepared. The modified block copolymer composition comprises the modified block copolymer A and optionally the coupled block copolymer B and/or the block copolymer C (such as an unmodified block copolymer).

(Hot-Melt Adhesive Composition)

The hot-melt adhesive composition according to the present invention comprises 100 parts by mass of the modified block copolymer composition according to the present invention, 25 to 400 parts by mass of a tackifying resin, 0.01 to 50 parts by mass of a cross-linking agent, and 0 to 200 parts by mass of a plasticizer.

The tackifying resin used in the present invention can be a conventionally known tackifying resin. Specific examples of the tackifying resin include rosin; modified rosins such as disproportionated rosins and dimerized rosins; esterified products of polyhydric alcohols, such as glycol, glycerol, and pentaerythritol, with rosin or modified rosins; terpene resins; aliphatic, aromatic, alicyclic, or aliphatic-aromatic copolymerized hydrocarbon resins or hydrides thereof; phenol resins; coumarone-indene resins; and the like. Among these, preferred are aliphatic, aromatic, alicyclic, or aliphatic-aromatic copolymerized hydrocarbon resins or hydrides thereof because they have high miscibility with the modified block copolymer composition according to the present invention. These tackifying resins may be used alone or in combination.

The compounding amount of the tackifying resin in the hot-melt adhesive composition according to the present invention is 25 to 400 parts by mass, preferably 50 to 350 parts by mass, more preferably 60 to 300 parts by mass relative to 100 parts by mass of the modified block copolymer composition.

The cross-linking agent used in the present invention can be any cross-linking agent used in the adhesive compositions. Specific examples of the cross-linking agent include peroxide cross-linking agents, sulfur-based cross-linking agents, photopolymerization initiators, and the like. These cross-linking agents can be used alone or in combination.

Examples of the peroxide cross-linking agent include t-butyl hydroperoxide, cumene hydroperoxide, dicumyl peroxide, di-t-butyl peroxide, t-butylcumyl peroxide, 2,5-dimethyl-t-butylperoxyhexane, 2,5-dimethyl-t-butylperoxyhexyne, 1,3-bis(t-butylperoxyisopropyl)benzene, p-chlorobenzoyl peroxide, t-butyl peroxybenzoate, t-butyl peroxyisopropylcarbonate, t-butyl benzoate, and the like. In the case where the peroxide cross-linking agent is used as a cross-linking agent, the peroxide cross-linking agent can be used in combination with a polyfunctional unsaturated compound such as trimethylolpropane trimethacrylate, divinylbenzene, ethylene dimethacrylate, polyethylene glycol dimethacrylate, triallyl isocyanurate, triallyl cyanurate, diallyl phthalate, diallyl itaconate, triallyl trimellitate, or the like as a vulcanizing aid.

Examples of the sulfur-based cross-linking agent include sulfur such as powdered sulfur, sublimed sulfur, precipitated sulfur, colloidal sulfur, surface-treated sulfur, and insoluble sulfur; sulfur compounds such as sulfur chloride, sulfur dichloride, morpholine disulfide, alkylphenol disulfide, N,N'-dithio-bis(hexahydro-2H-azepin-2-one), phosphorus-containing polysulfide, and polymer polysulfides; tetramethylthiuram disulfide, selenium dimethyldithiocarbamate, 2-(4'-moipholinodithio)benzothiazole, and the like. In the case where the sulfur-based cross-linking agent is used as a cross-linking agent, the sulfur-based cross-linking agent can be used in combination with a sulfur vulcanization accelerator such as stearic acid; a guanidine-based, aldehyde-amine-based, aldehyde-ammonia-based, thiazole-based, sulfenamide-based, thiourea-based, or xanthate-based vulcanization accelerator; or the like.

The photopolymerization initiator to be used can be a compound sensitive to chemical rays (preferably visible light or ultraviolet light) to generate free radicals which initiate the polymerization of one or more monomers without making excessive termination. Alternatively, the photopolymerization initiator may be a compound which generates free radicals if induced by a sensitizer activated by radiation. Specific examples of the photopolymerization initiator include quinones, benzophenone, benzoin ether, allyl ketones, biimidazole, benzyl dimethyl ketal, hydroxy alkyl phenylacetones, dialkoxy acetophenones, trimethylbenzoylphosphine oxide derivatives, aminoketones, benzoylcyclohexanol, methyl thiophenyl morpholino ketones, morpholino phenyl amino ketones, alpha-halogenoacetophenones, oxysulfonyl ketones, sulfonyl ketones, oxysulfonyl ketones, sulfonyl ketones, benzoyloxime esters, thioxanthone, camphorquinone, ketocoumarin, Michler's ketone, and the like.

The compounding amount of the cross-linking agent in the hot-melt adhesive composition according to the present invention is 0.01 to 50 parts by mass, preferably 0.01 to 20 parts by mass, more preferably 0.01 to 10 parts by mass relative to 100 parts by mass of the modified block copolymer composition.

Any plasticizer can be used without limitation, and liquid organic compounds at room temperature (23° C.) are suitably used. It is sufficient that such a plasticizer has miscibility with the modified block copolymer composition according to the present invention, and any of such plasticizers can be used without limitation. Examples thereof include, but should not be limited to, those used in standard hot-melt adhesive compositions, such as aromatic, paraffin-based, or naphthene-based process oils; liquid polymers such as polybutene and polyisobutylene; and the like.

Among these, paraffin-based or naphthene-based process oils are particularly suitable. These plasticizers can be used alone or in combination.

The compounding amount of the plasticizer in the hot-melt adhesive composition according to the present invention is 0 to 200 parts by mass, preferably 1 to 150 parts by mass, more preferably 2 to 100 parts by mass relative to 100 parts by mass of the modified block copolymer composition. The compounding amount of the plasticizer within this range results in excellent viscosity properties while bleed is prevented.

Moreover, the hot-melt adhesive composition according to the present invention may contain other polymers as components other than the components described above. Examples of the other polymers include, but should not be limited to, conjugated diene homopolymers such as polybutadiene and polyisoprene; aromatic vinyl-conjugated diene random copolymers such as (styrene-butadiene) random copolymers and (styrene-isoprene) random copolymers; aromatic vinyl homopolymers such as polystyrene; polymers having elasticity at room temperature (23° C.) such as isobutylene polymers, acrylic polymers, ester polymers, ether polymers, urethane polymers, and polyvinyl chloride; and the like. These other polymers can be used alone or in combination. Although the compounding amount of the other polymers in the hot-melt adhesive composition according to the present invention is not particularly limited, the amount is preferably 20 parts by mass or less, more preferably 10 parts by mass or less relative to 100 parts by mass of the modified block copolymer composition.

The hot-melt adhesive composition according to the present invention may optionally contain an antioxidant. Any antioxidant can be used without limitation. Examples thereof include hindered phenol compounds such as pentaerythritol tetrakis[3-(3,5-di-t-butyl-4-hydroxyphenyl)propionate], octadecyl-3-(3,5-di-t-butyl-4-hydroxyphenyl)propionate, 2,6-di-t-butyl-p-cresol, and di-t-butyl-4-methylphenol; thiodicarboxylate esters such as dilauryl thiopropionate; phosphites such as tris(nonylphenyl)phosphite; and the like. These antioxidants can be used alone or in combination. Although the compounding amount of the antioxidant in the hot-melt adhesive composition according to the present invention is not particularly limited, the amount is preferably 10 parts by mass or less, more preferably 0.5 to 5 parts by mass relative to 100 parts by mass of the modified block copolymer composition.

The hot-melt adhesive composition according to the present invention may further contain other compounding agents such as wax, a heat stabilizer, an ultraviolet absorbing agent, a filler, and the like. The hot-melt adhesive composition according to the present invention is preferably a solvent-free composition which does not contain any solvent.

The hot-melt adhesive composition according to the present invention can be prepared by any method, and it is sufficient that the modified block copolymer composition according to the present invention is mixed with the components described above. Examples of the method include a method of dissolving the components in a solvent, uniformly mixing these, and removing the solvent by heating or the like; and a method of melt kneading the components in a kneader; and the like. Among these methods, suitable is melt kneading to more efficiently perform the mixing. Although not particularly limited, the temperature during melt kneading is usually in the range of 100 to 200° C.

(Cured Adhesive Composition)

The cured adhesive composition according to the present invention is prepared by cross-linking the hot-melt adhesive composition according to the present invention.

Any cross-linking method can be used without limitation, and may be selected according to the type of the cross-linking agent contained in the hot-melt adhesive composition. Examples thereof include a method using heating, a method using chemical rays (preferably visible light or ultraviolet light), and the like.

In the cured adhesive composition according to the present invention, preferably 20 mass % or more, more preferably 50 mass % or more, still more preferably 70 mass % or more of the block copolymers contained in the hot-melt adhesive composition is cross-linked to improve the heat resistance. In particular, because the hot-melt adhesive composition according to the present invention has not only excellent hot-melt properties, thermal stability, and high-temperature adhesiveness but also high cross-linkability, the block copolymers contained in the hot-melt adhesive composition can be cross-linked in such a relatively high cross-linking proportion as above even with a relatively amount of energy.

The hot-melt adhesive composition according to the present invention and the cured adhesive composition can be used in any application (to any object to be bonded) without limitation, and can be used in a variety of bonding applications where hot-melt adhesives can be used. Among these, the hot-melt adhesive composition according to the present invention and the cured adhesive composition are particularly suitably used as an adhesive for so-called pressure sensitive tapes each including a film-shaped substrate and an adhesive composition melt applied thereto. For example, after melted by heating, the hot-melt adhesive composition according to the present invention can be melt applied to the substrate; and before the adhesive composition completely solidifies, an object made of the same or different material as or from that for the substrate can be bonded thereto by press bonding. At this time, the hot-melt adhesive composition can also be cross-linked into a cured adhesive composition. The hot-melt adhesive composition according to the present invention, which has excellent hot-melt properties, contributes to a reduction in rejection rate and an improvement in productivity in manufacturing of such tapes. In addition, the resulting tapes have excellent thermal stability and high-temperature adhesiveness as adhesives. The hot-melt adhesive composition according to the present invention and the cured adhesive composition can be suitably used in the following applications, i.e., sanitary goods such as disposable paper diapers and sanitary napkins; packagings for food products such as frozen food products, fresh food products, and confectionery; packagings for members such as automobile parts and mechanical parts; packagings for electrical products such as televisions, audio products, and refrigerators; bookbinding of slips, books, and catalogs; making of bags such as kraft bags, polypropylene bags, and polyethylene bags; applications to clothes such as hemming of coats, bonding of leathers and fabrics, and bonding of interliners; and the like.

EXAMPLES

Hereinafter, the present invention will be described with reference to more detailed Examples, but these Examples are not limitative to the present invention. In the description below, "parts" and "%" are mass-based unless otherwise specified. The tests and the evaluations were performed as below.

A variety of measurements were performed according to the following methods.

[Weight Average Molecular Weight and Molecular Weight Distribution]

High performance liquid chromatography was performed using tetrahydrofuran at a flow rate of 0.35 ml/min as a carrier to determine the molecular weight, which was calibrated against polystyrene standards. The apparatus used was HLC8220 available from Tosoh Corporation provided with three Shodex KF-404HQ columns (available from Showa Denko K.K.) connected in series (column temperature: 40° C.). The detectors used were a differential refractometer and an ultraviolet detector. The molecular weight was calibrated at 12 points of the standard polystyrenes (500 to 3000000) available from Polymer Laboratories Ltd.

[Contents of Block Copolymers in Modified Block Copolymer Composition]

The contents of the block copolymers in the modified block copolymer composition were determined from the ratio of the areas of the peaks corresponding to the block copolymers in the chart obtained by high performance liquid chromatography above.

[Styrene Unit Content of (Entire) Modified Block Copolymer Composition]

The styrene unit content of the entire modified block copolymer composition was determined based on the measurement by proton NMR.

[Melt Index of Modified Block Copolymer Composition]

The melt index of the modified block copolymer composition was measured according to ASTM D1238 (condition G, 200° C., load: 5 kg).

[Proportion of Modified Terminal in Total Polymer Chain Terminals]

The proportion of the modified terminal in the total polymer chain terminals was calculated as the proportion (mol %) of the used amount of the compound having a silicon atom and an acrylic group and/or a methacrylic group per the used amount of the organic lithium initiator. In this calculation, the proportion of the modified terminal in the total polymer chain terminals excluded the proportion of the modified terminal consumed during generation of the coupled block copolymer B.

[Production of Adhesive by Hot Melting]

10 g of the hot-melt adhesive composition was sampled, and the melt viscosity at 180° C. (unit: mPa·s) was measured with a Brookfield Theimosel viscometer using a rotor No. 27. A melt viscosity of 300,000 mPa·s or less was ranked as "excellent", which indicates that the composition had high hot-melt properties to facilitate the production of an adhesive by hot melting, while a melt viscosity of more than 300,000 mPa·s was ranked as "defective", which indicates that the composition had poor hot-melt properties.

[Cross-Linkability of Hot-Melt Adhesive Composition]

The hot-melt adhesive composition was cross-linked through irradiation under a metal halide lamp at 0.5 J/cm$^2$ to yield a cured adhesive composition. The cured adhesive composition was then measured by high performance liquid chromatography to evaluate the cross-linkability. From the chart obtained as a result of the measurement, the cross-linkability was ranked as "excellent" if 20% or more of the block copolymers contained in the modified block copolymer composition was cross-linked to have a higher molecular weight, which indicates high cross-linkability. The cross-linkability was ranked as "defective" if less than 20% of the block copolymers therein was cross-linked, which indicates that the block copolymers were not sufficiently cross-linked.
[Adhesive Residue Derived from Hot-Melt Adhesive Composition]

A sample for measurement was prepared as follows: A hot-melt adhesive composition was applied onto a polypropylene plate by press bonding at 23° C. at a rate of 300 mm/min using a 2 kg rubber roller, and was left at 100° C. for 24 hours. For the peel adhesion strength (14/m) at 23° C., according to PSTC-1 (180° peel adhesive test according to US Pressure Sensitive Tape Council), the sample for measurement was peeled at a peel rate of 15 m/min using a high-speed peel tester "TE-701-S" available from TESTER SANGYO CO., LTD. as a measurement apparatus. The thermal stability of the hot-melt adhesive composition was evaluated by visually observing the polypropylene after peel to check the presence or absence of an adhesive residue. Specifically, the sample with no adhesive residue visually observed was determined as "no adhesive residue", and was ranked as "excellent". On the other hand, the sample with an adhesive residue visually observed was determined as "adhesive residue present", and was ranked as "defective".
[Shear Adhesion Failure Temperature (SAFT) of Hot-Melt Adhesive Composition]

The hot-melt adhesive composition was melt applied into a thickness of 20 μm onto a 25 μm PET film. This coated sheet was press bonded to an object made of stainless steel at a rate of 300 mm/min using a 2 kg rubber roller so as to form a bonding portion of 10×25 mm. Using the resulting test piece, the shear adhesion failure temperature (SAFT) was measured as follows: Using a weight of 500 g, a load was applied to the object made of stainless steel (bonding portion: 10×25 mm), and the measurement was performed at a temperature raising rate of 0.5° C./min. It can be determined that a higher shear adhesion failure temperature (SAFT) indicates more excellent high-temperature adhesiveness (adhesive force at high temperature).

Example 1

(Preparation of Modified Block Copolymer Composition)

22 kg of a mixed solvent of n-butane and cyclohexane (mass proportion:30/70), 2 mmol of tetramethylethylenediamine, and 70 mmol of n-butyllithium as an initiator were placed into a 50-liter pressure-resistant reactor, and 0.36 kg of styrene was added and polymerized at 30° C. for one hour. In the next step, 8.3 kg of isoprene was added and polymerized for an hour and a half while the reaction temperature was being controlled within the range of 50 to 60° C. by reflux cooling. Subsequently, 0.36 kg of styrene was added and polymerized at 50° C. for 1 hour. After it was checked that the polymerization conversion ratio reached a range of 95% to 100%, 56 mmol (the amount equivalent to 0.8-fold mol of n-butyllithium used) of tetramethoxysilane (hydrocarbyloxysilane compound (α) without an acrylic group and/or a methacrylic group) was added and reacted for 30 minutes. In the next step, 42 mmol (the amount equivalent to 0.6-fold mol of n-butyllithium used) of 3-acryloyloxypropyl(trimethoxysilane) (hydrocarbyloxysilane compound (β) having an acrylic group and/or a methacrylic group) was added, followed by stirring for 30 minutes. Subsequently, methanol as a polymerization terminator was added in an amount equivalent to 2-fold mol of n-butyllithium used, and 40 g of 2,6-di-tert-butyl-p-cresol as an antioxidant was added and mixed. The resulting mixed solution was added dropwise in portions to hot water heated to 85 to 95° C. to volatilize the solvent, thus obtaining a precipitate. The precipitate was pulverized, and was dried with hot air at 85° C. to prepare a modified block copolymer composition.

The styrene content in the entire modified block copolymer composition was 8%. The weight average molecular weight (Mw) calibrated against polystyrene standards was 210,000. The melt index (condition G) was 20 g/10 min. The modified block copolymer A had a molecular weight distribution (Mw/Mn) of 1.01. The content of the modified block copolymer A in the modified block copolymer composition was 60%. The coupled block copolymer B had a molecular weight distribution (Mw/Mn) of 1.01. The content of the coupled block copolymer B in the modified block copolymer composition was 40%.

(Preparation of Hot-Melt Adhesive Composition)

100 parts of the modified block copolymer composition prepared above was placed into an agitator type kneader, and 100 parts of a tackifying resin (ARKON M-100; alicyclic hydrocarbon resin, available from ARAKAWA CHEMICAL INDUSTRIES, LTD.), 20 parts of naphthene-based process oil (Shellflex 371, available from Shell Chemicals) as a plasticizer, 1 part of benzyl dimethyl ketal (IRGACURE 651, available from BASF SE) as a cross-linking agent, and 1.5 parts of a hindered phenol-based antioxidant (Irganox 1010, available from Ciba-Geigy AG) were added thereto. The inside of the system was purged with nitrogen gas, and the materials were kneaded at 160 to 180° C. for 2 hours to prepare a hot-melt adhesive composition.

The resulting hot-melt adhesive composition was measured and evaluated for the production of an adhesive by hot melting, the cross-linkability, adhesive residues, and the shear adhesion failure temperature (SAFT). The results are shown in Table 1.

Example 2

(Preparation of Modified Block Copolymer Composition)

A modified block copolymer composition was prepared in the same manner as in Example 1 except that the amount of styrene used in the first-stage polymerization was changed to 0.63 kg, the amount of isoprene used was changed to 7.7 kg, the amount of styrene used in the second-stage polymerization was changed to 0.63 kg, the amount of tetramethoxysilane (TMS) used was changed to 70 mmol (the amount equivalent to 1-fold mol of n-butyllithium used), and the amount of 3-acryloyloxypropyl(trimethoxysilane) used was changed to 56 mmol (the amount equivalent to 0.8-fold mol of n-butyllithium used). The resulting modified block copolymer composition was as shown in Table 1.

(Preparation of Hot-Melt Adhesive Composition)

A hot-melt adhesive composition was prepared in the same manner as in Example 1 except that the modified block copolymer composition prepared above was used, and was evaluated in the same manner as in Example 1. The results are shown in Table 1.

Example 3

(Preparation of Modified Block Copolymer Composition)

A modified block copolymer composition was prepared in the same manner as in Example 1 except that the amount of styrene used the first-stage polymerization was changed to 0.9 kg, the amount of isoprene used was changed to 7.2 kg, the amount of styrene used in the second-stage polymerization was changed to 0.9 kg, the amount of n-butyllithium used was changed to 75 mmol, the amount of tetramethoxysilane used was changed to 75 mmol (the amount equivalent to 1-fold mol of n-butyllithium used), and 3-acryloyloxypropyl(trimethoxysilane) was replaced by 75 mmol (the amount equivalent to 1-fold mol of n-butyllithium used) of 3-methacryloyloxyethylpropyl(trimethoxysilane). The resulting modified block copolymer composition was as shown in Table 1.

(Preparation of Hot-Melt Adhesive Composition)

A hot-melt adhesive composition was prepared in the same manner as in Example 1 except that the modified block copolymer composition prepared above was used, and was evaluated in the same manner as in Example 1. The results are shown in Table 1.

Example 4

(Preparation of Modified Block Copolymer Composition)

A modified block copolymer composition was prepared in the same manner as in Example 1 except that the amount of styrene used in the first-stage polymerization was changed to 1.35 kg, the amount of isoprene used was changed to 6.3 kg, the amount of styrene used in the second-stage polymerization was changed to 1.35 kg, the amount of n-butyllithium was changed to 75 mmol, the amount of tetramethoxysilane used was changed to 75 mmol (the amount equivalent to 1-fold mol of n-butyllithium used), and 3-acryloyloxypropyl (trimethoxysilane) was replaced by 150 mmol (the amount equivalent to 2-fold mol of n-butyllithium used) of 3-methacryloyloxyethylpropyl(trimethoxysilane). The resulting modified block copolymer composition was as shown in Table 1.

(Preparation of Hot-Melt Adhesive Composition)

A hot-melt adhesive composition was prepared in the same manner as in Example 1 except that the modified block copolymer composition prepared above was used, and was evaluated in the same manner as in Example 1. The results are shown in Table 1.

Comparative Example 1

(Preparation of Block Copolymer Composition)

A block copolymer composition was prepared in the same manner as in Example 3 except that the modification reactions with tetramethoxysilane and 3-methacryloyloxyethylpropyl(trimethoxysilane) were not performed. The resulting block copolymer composition was as shown in Table 1.

(Preparation of Hot-Melt Adhesive Composition)

A hot-melt adhesive composition was prepared in the same manner as in Example 1 except that the block copolymer composition prepared above was used, and was evaluated in the same manner as in Example 1. The results are shown in Table 1.

Comparative Example 2

(Preparation of Block Copolymer Composition)

A block copolymer composition was prepared in the same manner as in Example 3 except that the modification reaction with 3-methacryloyloxyethylpropyl(trimethoxysilane) was not performed. The resulting block copolymer composition was as shown in Table 1.

(Preparation of Hot-Melt Adhesive Composition)

A hot-melt adhesive composition was prepared in the same manner as in Example 1 except that the block copolymer composition prepared above was used, and was evaluated in the same manner as in Example 1. The results are shown in Table 1.

TABLE 1

| | Example 1 | Example 2 | Example 3 | Example 4 | Comparative Example 1 | Comparative Example 2 |
|---|---|---|---|---|---|---|
| n-Butyllithium (mmol) | 70 | 70 | 75 | 75 | 75 | 75 |
| Tetramethylethylenediamine (mmol) | 2 | 2 | 2 | 2 | 2 | 2 |
| First modification step | | | | | | |
| Modifier (hydrocarbyloxysilane compound ($\alpha$))[1] | TMS | TMS | TMS | TMS | — | TMS |
| Amount added (modifier (mol)/initiator (mol)) | 0.8 | 1 | 1 | 1 | — | 1 |
| Second modification step | | | | | | |
| Modifier (hydrocarbyloxysilane compound ($\beta$))[2] | Acrylic silane | Acrylic silane | Methacrylic silane | Methacrylic silane | — | — |
| Amount added (modifier (mol)/initiator (mol)) | 0.6 | 0.8 | 1 | 2 | — | — |
| Modified block copolymer A[3] | | | | | | |
| Molecular weight distribution (Mw/Mn) | 1.01 | 1.01 | 1.02 | 1.01 | 1.02 | 1.01 |
| Content (%) | 60 | 95 | 95 | 94 | 100 | 94 |
| Coupled block copolymer B | | | | | | |
| Molecular weight distribution (Mw/Mn) | 1.01 | 1.01 | 1.02 | 1.02 | — | 1.02 |
| Content (%) | 40 | 5 | 5 | 6 | — | 6 |
| Modified block copolymer composition[3] | | | | | | |
| Total styrene content (%) | 8 | 14 | 20 | 30 | 20 | 20 |
| Weight average molecular weight (Mw) (($\times 10^3$) g/mol) | 210 | 200 | 185 | 170 | 185 | 185 |

TABLE 1-continued

| | Example 1 | Example 2 | Example 3 | Example 4 | Comparative Example 1 | Comparative Example 2 |
|---|---|---|---|---|---|---|
| Melt index (g/10 min) | 20 | 13 | 11 | 9 | 11 | 11 |
| Proportion (mol %) of modified terminal in total polymer chain terminals | 40≤ | 70≤ | 90≤ | 90≤ | — | — |
| Results of evaluation | | | | | | |
| Production of adhesive by hot melting | Excellent | Excellent | Excellent | Excellent | Excellent | Excellent |
| Cross-linkability (UV:0.5J/cm$^2$, conversion into higher molecular weight block copolymers: 20% or more) | Excellent | Excellent | Excellent | Excellent | Defective | Defective |
| Adhesive residue test in peel test after left at high temperature (100° C., 24 h) | Excellent | Excellent | Excellent | Excellent | Defective | Defective |
| SAFT (° C.) | 118 | 122 | 126 | 130 | 113 | 113 |

*[1]"TMS" represents tetramethoxysilane,
*[2]"Acrylic silane" represents 3-acryloyloxypropyl(trimethoxysilane).
"Methacrylic silane" represents 3-methacryloyloxyethylpropyl(trimethoxysilane).
*[3]In Comparative Example 1, an unmodified block copolymer was used.

Table 1 shows that the hot-melt adhesive compositions (Examples 1 to 4) prepared using the modified block copolymer compositions according to the present invention had good results for the evaluation of production of an adhesive by hot melting, in which the hot-melt properties (fluidity during heating) are evaluated. Table 1 also shows that the hot-melt adhesive compositions had good results for the evaluation of adhesive residues, in which the thermal stability is evaluated, had high cross-linkability, and had a high shear adhesion failure temperature (SAFT), which is a measure of the high-temperature adhesiveness. In contrast, in the case where the block copolymer compositions in Comparative Examples 1 and 2 were used, the compositions had insufficient thermal stability (poor result in the evaluation of adhesive residues), had inferior cross-linkability, and had a low shear adhesion failure temperature (SAFT), which is a measure of the high-temperature adhesiveness.

The invention claimed is:

1. A modified block copolymer composition, comprising:
a modified block copolymer containing at least one aromatic vinyl polymer block and at least one conjugated diene polymer block, and having at least one modified terminal modified with a compound having a silicon atom and further comprising an acrylic group and/or a methacrylic group,
wherein the modified terminal has a structure in which a hydrocarbyloxysilane compound (β) having an acrylic group and/or a methacrylic group is bonded via a hydrocarbyloxysilane compound (α) without either of an acrylic group or a methacrylic group.

2. The modified block copolymer composition according to claim 1,
wherein the modified terminal has a structure in which the hydrocarbyloxysilane compound (β) having an acrylic group and/or a methacrylic group is bonded via a tetraalkoxysilane compound as the hydrocarbyloxysilane compound (α) without either of an acrylic group or a methacrylic group.

3. The modified block copolymer composition according to claim 1,
wherein the proportion of the modified terminal is 10 mol % or more of the polymer chain terminals of the total block copolymers contained in the modified block copolymer composition.

4. The modified block copolymer composition according to claim 1,
wherein a content of aromatic vinyl monomer units in the modified block copolymer composition is in a range of 0.1 to 50 mass %,
a weight average molecular weight (Mw) of the entire modified block copolymer composition is in a range of 10,000 to 1,000,000, and
a melt index of the modified block copolymer composition measured according to ASTM D1238 measured at condition G, 200° C., load: 5 kg is in a range of 0.1 to 100 g/10 min.

5. A hot-melt adhesive composition, comprising:
100 parts by mass of the modified block copolymer composition according to claims 1;
25 to 400 parts by mass of a tackifying resin;
0.01 to 50 parts by mass of a cross-linking agent; and
0 to 200 parts by mass of a plasticizer.

* * * * *